340-870.11 SR

XR 3,059,228

Oct. 16, 1962 R. M. BECK ET AL 3,059,228

MULTIPLEXING SAMPLE AND HOLD CIRCUIT

Filed Oct. 26, 1959 3 Sheets-Sheet 1

INVENTORS:
Robert M. Beck
Max Palevsky
By Smyth & Roston
Attorneys

Oct. 16, 1962 R. M. BECK ET AL 3,059,228

MULTIPLEXING SAMPLE AND HOLD CIRCUIT

Filed Oct. 26, 1959 3 Sheets-Sheet 2

INVENTORS:
Robert M. Beck
Max Palevsky

By Smyth & Roston

Attorneys,

MULTIPLEXING SAMPLE AND HOLD CIRCUIT

Filed Oct. 26, 1959 3 Sheets-Sheet 3

INVENTORS:
Robert M. Beck
Max Palevsky
By Smyth & Roston
Attorneys, 3,059,228

MULTIPLEXING SAMPLE AND HOLD CIRCUIT

Robert M. Beck and Max Palevsky, Los Angeles, Calif., assignors to Packard-Bell Computer Corporation, a corporation of California Filed Oct. 26, 1959, Ser. No. 848,738
11 Claims. (Cl. 340—179)

This invention relates to a sampling system and, more particularly, to a sampling system in which analog electrical signals are simultaneously sampled and then sequentially converted to digital electrical signals.

In many applications, it is desirable to determine the condition of a number of devices or input circuits at one instant. For example, the devices may be in the form of thermocouples utilized to measure the temperature at various points in a system. The electrical signals provided by the thermocouples are in the form of analog potentials and it is often necessary to convert the signals to digital form for introduction to a digital computer or to a telemetering transmission system. There are many different types of analog-to-digital converters and the converter disclosed in the copending patent application Serial No. 737,697 by Robert M. Beck, George J. Giel, and Max Palevsky, filed on May 26, 1958, is illustrative.

The accuracy of each of these analog-to-digital converters depends in part upon the frequency of the analog input variations and the speed of conversion. Actually, the converter does not convert an instantaneous value of the analog input to a digital signal but converts a value averaged over a sampling or conversion interval. The shorter the required conversion interval to provide the digital output, the greater the speed of the converter. The speed of the converter is generally a limiting factor in a system including the converter. With shorter conversion intervals or greater conversion speeds, a higher frequency signal may be sampled and converted with the same conversion accuracy.

With finite minimum conversion intervals, in order to sample a number of input signals, either a separate converter is utilized for each input signal, or the input signals are sampled sequentially. Because of the substantial cost of analog-to-digital converters, simultaneous sampling has heretofore not been economical and sequential sampling, which requires only one converter, is generally utilized.

In a specific illustrative embodiment of this invention, a sampling system is provided which simultaneously samples a large number of analog input signals and utilizes only a single analog-to-digital converter. The simultaneously sampled signals are stored and sequentially introduced to the converter for conversion to digital form. The storage means for storing the simultaneously sampled signals permits the utilization of a relatively small sampling interval so that the effective conversion interval of the sampling system including the converter is much smaller than the conversion interval of the converter alone. In other words, when the converter is included in the sampling system, higher frequency signals may be converted to digital form with the same accuracy.

Features of this invention pertain to the provision of means for sampling higher frequency signals without reducing the accuracy or the actual conversion speed of the analog-to-digital converter.

The sampling system includes a number of electronic sampling switches which are coupled individually to the sources of the analog input signals. Under control of a programmer, the sampling switches are simultaneously operated at the beginning of a conversion cycle. The sampling switches introduce the sampled signals to individually associated capacitive storage means. The charging time constant for the storage means is small so that during the operation of the sampling switches, the potentials at the storage means are substantially the same as the varying input signals.

The switching durations or aperture times of the sampling switches are less than one microsecond. The effective sampling interval is quite small because of the relatively high frequency response of the capacitive storage means even though the sampling switches may remain operated for a longer interval. The effective sampling interval is toward the end of the operating interval of the sampling switches because it is the final potential at the capacitive storage which is retained by the storage means. During the conversion cycle, the capacitive storage means are thereafter sequentially scanned utilizing electronic scan switches individually associated with the capacitive storage means.

The sequential outputs of the scan switches are introduced serially to an amplifier arrangement which samples each of the outputs and provides a constant potential over an interval at least as long as the conversion interval of the analog-to-digital converter. The converter successively digitizes the potentials provided thereto. The amplifier arrangement has a sample and a hold position. The programmer periodically operates the arrangement to its hold position and at the same time operates the converter to digitize the potential held by the amplifier arrangement. When the converter completes the digitizing conversion of the hold potential, it sets the amplifier arrangement back to its sample condition ready for the next sequentially provided scan output.

Further advantages and features of this invention will become apparent upon consideration of the following description when read in conjunction with the drawing wherein.

Figure 1:
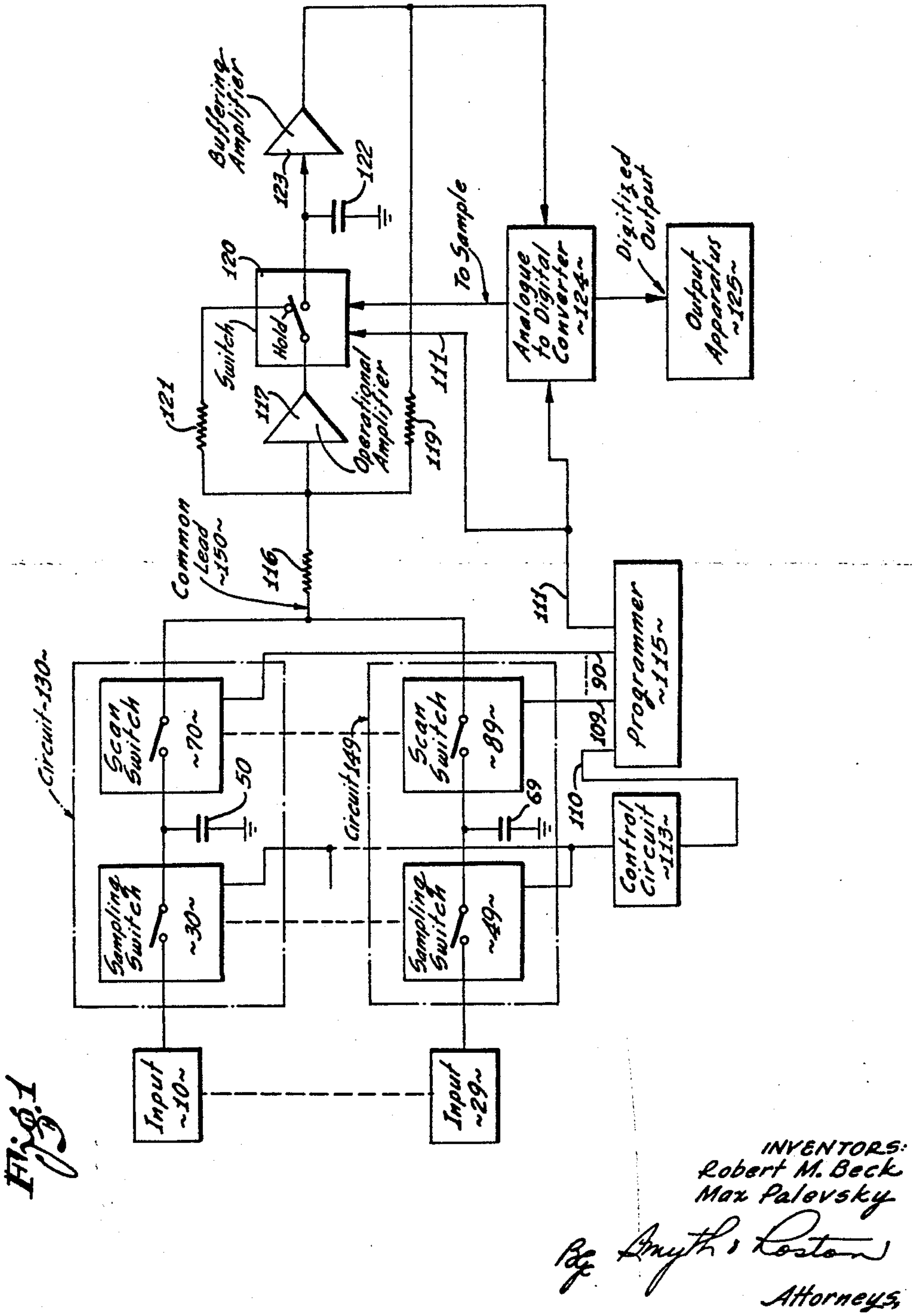
FIGURE 1 is a functional representation of the sampling system of this invention.

Referring first to FIGURE 1, the sampling system of this invention simultaneously samples analog potentials provided from the input circuits 10 through 29, inclusive. Though the description of the system is in reference to 20 input circuits, any number of input circuits may be sampled, either greater or smaller than 20. Each of the input circuits may be any sort of apparatus, device, or circuit which provides a varying electrical signal having a magnitude between plus and minus 8 volts and frequency components less than 1.6 kilocycles per second. These values for the input signals are also illustrative and are typical of those which are encountered in computing and telemetering systems.

The sampling of the analog signals provided from the input circuits 10 through 29, inclusive, is controlled from a programmer 115. The programmer 115 includes a number of timing elements, not shown, for providing pulses on the leads 90 through 111, inclusive, in a predetermined cyclic sequence, each cycle having a duration of approximately 1303 microseconds, with the input circuits 10 through 29 being sampled once during each cyclic operation of the programmer 115. In the specific illustrative embodiment, the twenty input circuits 10 through 29, inclusive, which are each sampled every 1303 microseconds so that effectively 15,500 input samplings are provided each second.

During each cyclic operation of the programmer 115, the input circuits 10 through 29 are simultaneously sampled and then the samplings are sequentially scanned to derive a series of analog potentials on a common lead 150. The serially arranged analog potentials derived from the input circuits 10 through 29 are successively digitized utilizing an analog-to-digital converter 124. The analog-to-digital converter 124 may be of the type described in the above-identified disclosure by Robert M. Beck, George J. Giel, and Max Palevsky. These various functions are all accomplished during each 1303 microsecond scanning cycle under control of the programmer 115. The specific duration of the scanning cycle and the sampling frequency are also merely illustrative. The duration of each scanning cycle, for example, is dependent upon the number of input circuits which are scanned and the conversion speed of the analog-to-digital converter 124. The analog-to-digital converter described in the above-identified disclosure by Beck et al. has an illustrative conversion speed of 50 microseconds for an 11 digit binary output. The scanning cycle duration of 1303 microseconds is predicated, in part, upon twenty input signals and a conversion speed of 50 microseconds.

Figure 2:
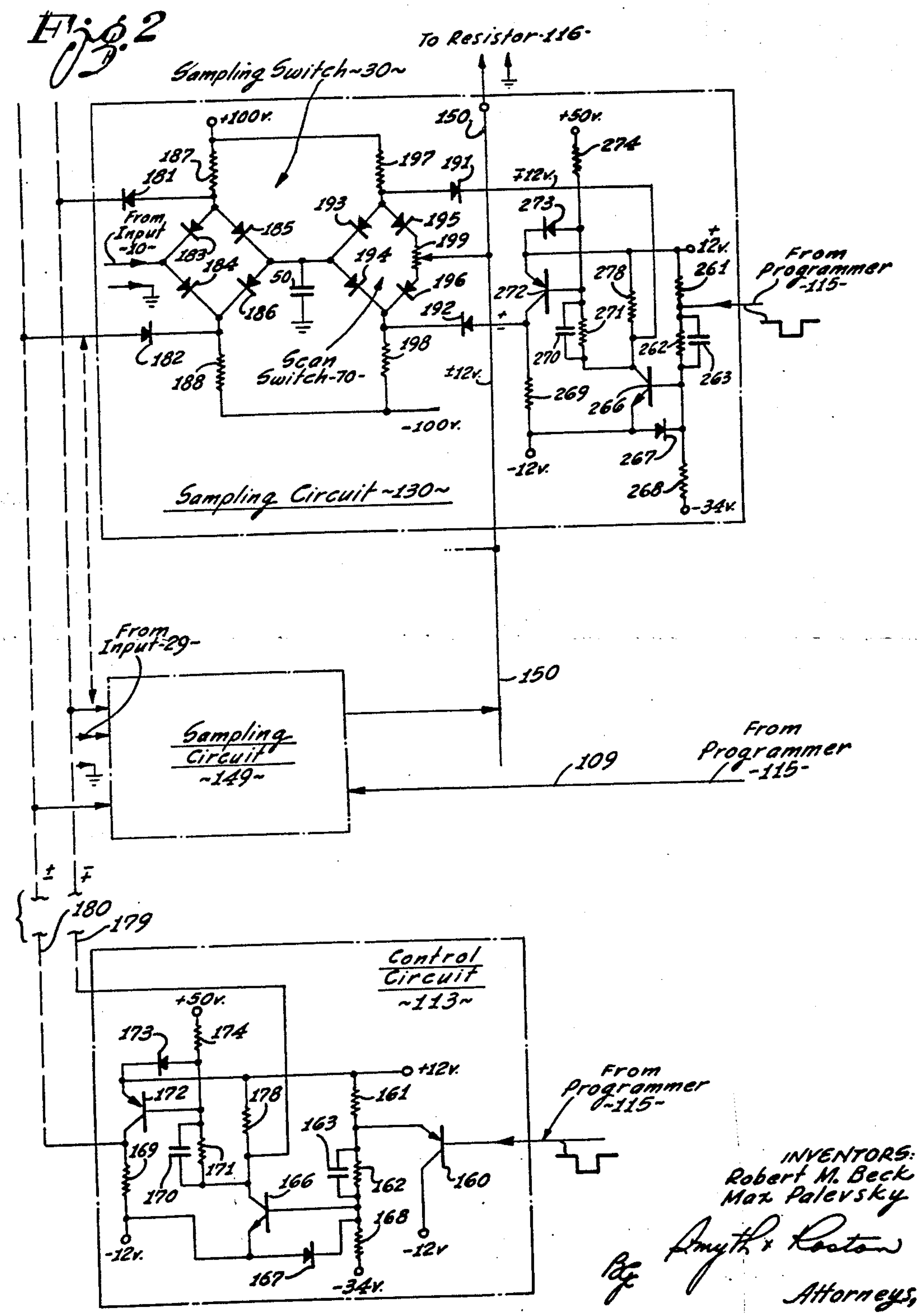
FIGURE 2 is a circuit representation of a portion of the sampling system of this invention.
Figure 3:
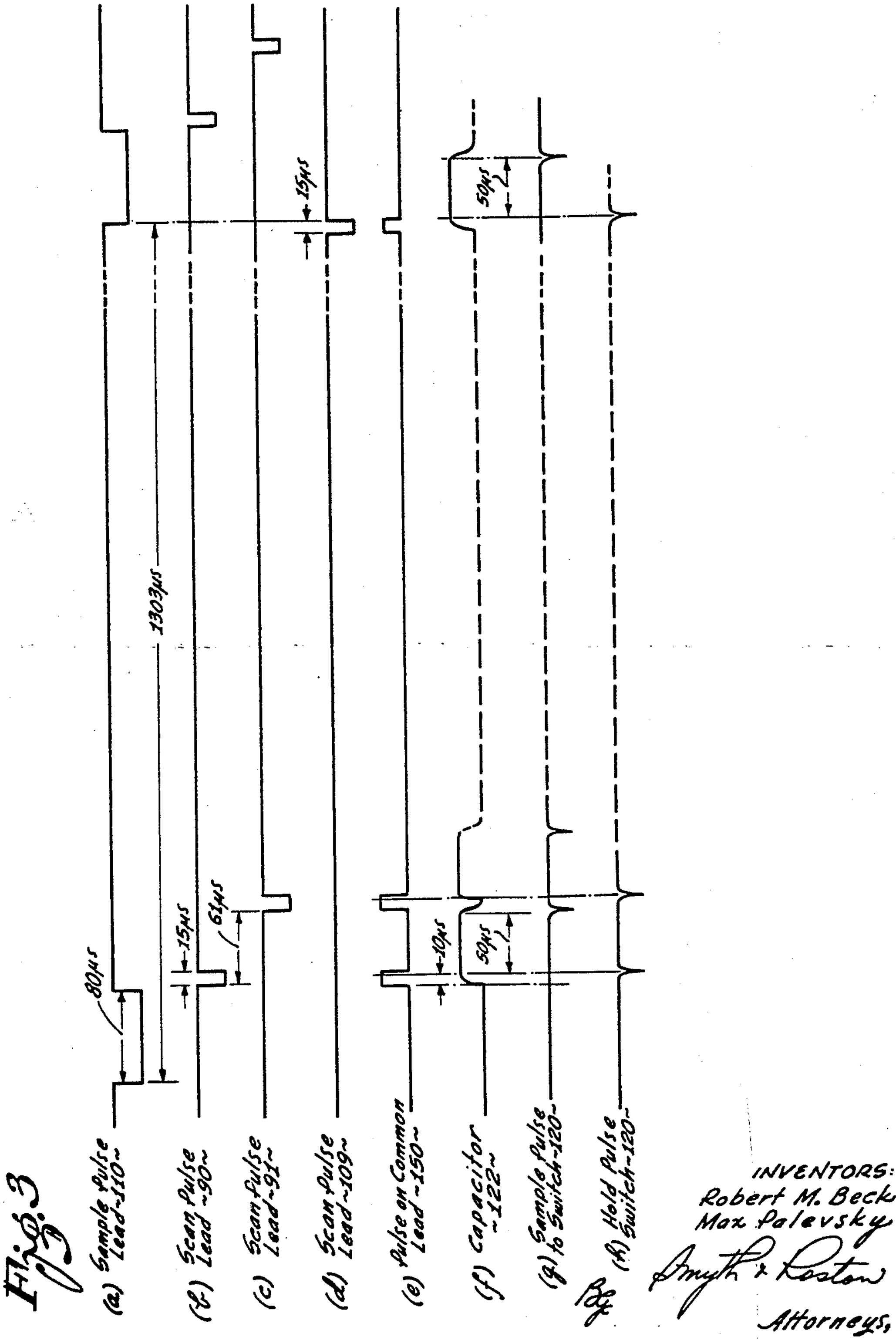
FIGURE 3 is a series of curves illustrating the operation of the sampling system of this invention.

The pulses provided from the programmer 115 during each scanning cycle are illustrated in FIGURE 3. At the beginning of each scanning cycle, a sampling pulse having a duration of 80 microseconds and an illustrative magnitude of minus 10 volts, is provided on lead 110. The lead 110 is coupled to a control circuit arrangement 113, the details of which are depicted in FIGURE 2 and hereinafter described. The control circuit 113 amplifies the 80 microsecond sampling pulse on lead 110 and closes twenty sample switches 30 through 49, inclusive, which are individually associated with the input circuits 10 through 29, inclusive. The sampling switches 30 through 49 are functionally illustrated in FIGURE 1 and are shown in detail in FIGURE 2. The details of the operation of the switches 30 through 49, inclusive, are also hereinafter described after a brief description of the functional operation of the sampling system of this invention.

The switches 30 through 49, inclusive, are included respectively as part of twenty similar sampling circuits 130 through 149. Each of the circuits 130 through 149, inclusive, as is hereinafter described, includes a sampling switch, a storage capacitor and a scan switch.

Each of the sampling switches 30 through 49, inclusive, is an electronic switch which establishes a connection from its associated input circuit through the switch in a very brief interval of less than 1 microsecond. The potentials provided at the input circuits 10 through 29, inclusive, are, therefore, simultaneously coupled through the operated sampling switches 30 through 49, inclusive. The sampling switches 30 through 49, inclusive, couple the input potentials respectively to 20 capacitors 50 through 69 inclusive. The capacitors 50 through 69, inclusive, are relatively small having suitable values such as 8,000 micro-microfarads. The charging time constants for the capacitors 50 through 69 are quite small because the sampling switches 30 through 49 present relatively small impedances when operated. The potential across the capacitors 50 through 69, inclusive, therefore, follows the variations of the respectively associated analog input potentials at the circuits 10 through 29, inclusive, during the time that the sampling switches 30 through 49 are operated.

At the end of the 80 microsecond sampling pulse from the programmer 115, the sampling switches 30 through 49, inclusive, are returned to their high impedance condition and the capacitors 50 through 69 remain charged at potentials corresponding to the associated analog input potentials at the end of the 80 microsecond sampling interval. Though the sampling interval under control of the programmer 115 has a duration of 80 microseconds, the effective sampling interval is much smaller because the capacitors 50 through 69 have a relatively high frequency response. The relatively high frequency response is achieved because of the small charging time constants. The potential at each of the capacitors 50 through 69 does not, therefore, represent an accumulative condition over the 80 microsecond interval but represents the potential condition at the input circuits 10 through 29 at a particular small increment just before the sampling switches 30 through 49 are opened. The switching speed of the sampling switches 30 through 49 under control of the circuit 113 is less than 1 microsecond so that the effective sampling increment at the capacitors 50 through 69, inclusive, is less than 1 microsecond. Though the samplings of each of the input analog signals are, therefore, spaced at relatively long increments, each sampling is of a relatively brief, less than 1 microsecond, interval of the input analog signals.

At the end of the 80 microsecond sampling interval, each of the capacitors 50 through 69 is, therefore, at a potential corresponding to its associated input analog potential over a particular very brief interval. After the programmer 115 provides the 80 microsecond sample pulse, it supplies scan pulses successively on the leads 90 through 109, inclusive. The leads 90 through 109 from the programmer 115 are individually coupled to twenty scan switches 70 through 89 which are individually associated with the capacitors 50 through 69. The scan switches 70 through 89 are similar to the sample switches 30 through 49 and function to establish a conductive connection from the associated capacitors through the scan switches when a scan pulse is provided from the programmer 115. As illustrated in FIGURE 3, the scan pulses illustratively have a duration of 15 microseconds and a magnitude of minus 10 volts.

With a repetition interval of 61 microseconds, and 20 input signals, the scanning cycle following the 80 microsecond sampling pulse has a duration of 61 times 20 or 1220 microseconds. A three microsecond interval follows the 80 microsecond sampling pulse and precedes the first scan pulse so that the programmer cycle has a total duration of 1303 microseconds. This timing is merely illustrative as indicated above. For example, the interval between the sampling and the first scan pulse may be longer or shorter than 3 microseconds or the repetition period between scan pulses may be longer than 61 microseconds. For a cycle of 1303 microseconds, the magnitude of a 1.6 kilocycle input signal has a maximum change of 25 percent.

Responsive to the first scan pulse on the lead 90, the scan switch 70 is closed to couple the potential across the capacitor 50 to the common lead 150 which was briefly mentioned above. As the successive scan pulses are introduced to the leads 91 through 109, the scan switches 71 through 89 similarly are successively closed, or operated, to successively couple the sampling potentials which appear across the capacitors 51 through 69, inclusive, to the common lead 150. The signals through the common lead 150 are, therefore, a series arrangement of pulses spaced at intervals of 61 microseconds, with each having a magnitude corresponding to the substantially instanantaneous magnitude of one of the input analog signals and each having a duration of 15 microseconds. The pulses are serially arranged to correspond with the input analog signals with the first pulse corresponding to a sampling of the signal from the circuit 10, the second pulse being a sampling from the circuit 11, etc.

Though the sampling pulses on the common lead 150 are serially or sequentially arranged in this manner, they represent the magnitudes of the input analog signals during the same particular brief sampling interval. The input analog signals are sampled in parallel with the parallel samplings thereafter being sequentially arranged.

Before proceeding with a description of the rest of the sampling system illustrated in FIGURE 1, the switches 30 through 49 and 70 through 89 and the control circuit 113, which were functionally described above, are first described in detail. Circuit representations of these components are shown in FIGURE 2. As illustrated therein, the 80 microsecond sampling pulse from the programmer 115 is introduced to the base electrode of a transistor 160. The transistor 160 is one of three transistors 160, 166 and 172 which are included in the control circuit 113. The transistors 160 and 172 are PNP junction transistors illustratively of the type 2N404 and the transistor 166 is a NPN junction transistor illustratively of the type 2N385. The negative 80 microsecond pulse at the base electrode of the junction transistor 160 increases conduction through the transistor 160 because its emitter electrode is positively biased, being connected to a positive potential source by a resistor 161. The positive potential source may have a suitable value such as 12 volts, and the resistor 161 may have a suitable value such as 10 kilohms. The collector of the transistor 160 is negatively biased by a negative potential source having a suitable value such as minus 12 volts.

The resistor 161 is part of a voltage divider arrangement including a resistor 162, which is shunted by a capacitor 163, and a resistor 68. The serially connected resistors 161, 162 and 168 are connected between the plus 12 volt source and a negative potential source having a suitable value such as minus 34 volts. The resistors 162 and 168, respectively, have suitable values such as 10 kilohms and 39 kilohms so that the potential at the emitter electrode of the transistor 160 is positive with respect to the potential at its base. The capacitor 163, which may have a value of 27 microfarads, functions to short the resistor 162 during transients to reduce the aperture time for switching the condition of the switches 30 through 49.

When the transistor 160 becomes conductive, its emitter potential decreases toward minus 10 volts and the potential at the junction between the resistors 162 and 168 decreases correspondingly. The junction between the resistors 162 and 168 is coupled to the base electrode of the transistor 166.

The transistor 166 is normally conductive having its emitter electrode coupled to a negative potential source having a suitable magnitude such as minus 12 volts. The emitter electrode of the transistor 166 is also coupled by a normally reverse-biased diode 167 to the junction between the resistors 162 and 168. When the transistor 166 is conductive, the diode 167 is reverse biased because the potential at the base electrode of the transistor 166 is more positive than at its emitter electrode.

The collector electrode of the transistor 166 is biased by a connection through a resistor 178 to the twelve volt positive potential source. The resistor 178, which has a suitable value such as 27 kilohms, is part of a voltage divider arrangement including also the resistors 171 and 174 coupled between the plus 12 volt potential source and a plus 50 volt potential source. The resistor 174 is larger than the resistors 171 and 178, having a suitable value such as 270 kilohms which may be 10 times the resistance of the resistors 171 and 178. The resistor 171 is shunted by a capacitor 170 having a suitable value such as 27 microfarads. The capacitor 170 functions to short the resistor 171 during the switching interval so that the changes in potential at the output of the circuit 113 are quite abrupt.

With the transistor 166 normally conductive, the potential at its collector electrode is relatively negative. The junction transistor 172 is normally conductive since its base electrode is coupled to the junction between the resistors 174 and 171 which is relatively negative. The emitter electrode of the transistor 172 is coupled directly to the plus 12 volt potential source and its collector electrode is connected by a resistor 169 to the minus 12 volt potential source. The resistor 169 may have a suitable value such as 27 kilohms. The emitter-to-base junction of the transistor 172 is shunted by a diode 173 poled so as to be normally reverse-biased.

To briefly recapitulate, the transistor 160 is relatively non-conductive and the transistors 166 and 172 are relatively conductive before the sampling pulse is received.

The negative 80 microsecond sampling pulse increases the conduction through the transistor 160 and decreases the conduction through the transistors 166 and 172. The increase of conduction through the transistor 160 by the sampling pulse causes the potential at the base electrode of the transistor 166 to become more negative. The relatively negative potential reduces conduction through the transistor 166 to increase its collector potential. The relatively negative base potential of the transistor 166 also forward biases the diode 167 to shunt the current around the transistor 166. The effect of the diode 167 is, therefore, to reduce the switching interval for the current changes through the transistor 166 to take place.

The relatively positive potential at the collector electrode of the transistor 166 provides for a corresponding potential increase at the base electrode of the transistor 166 which provides for a corresponding potential increase at the base electrode of the transistor 172. The relatively positive potential at the base electrode of the transistor 172 reduces the conduction through the transistor 172 and forward biases the diode 173.

The output of the control circuit 113 is from the collector electrodes of the transistors 166 and 172. The collector electrode of the transistor 166 is coupled to a lead 179 and the collector electrode of the transistor 172 is connected to a lead 180. The potentials at the leads 179 and 180 are equal in magnitude but opposite in polarity for both the normal and operated conditions of the control circuit 113. When the control circuit 113 is normal, the transistors 166 and 172 are conductive and the potential on the lead 179 is substantially minus 12 volts and on the lead 180 is substantially plus 12 volts. When the 80 microsecond sampling pulse is received, the transistors 166 and 172 become non-conductive and the potential on the lead 179 changes to plus 12 volts and on the lead 180 to minus 12 volts.

The leads 179 and 180 are multipled to the 20 sampling circuits 130 through 149. The sampling circuits 130 through 149, as described above, are individually coupled between the input circuits 10 through 29 and the common lead 150. Each of the sampling circuits 130 through 149 includes a sampling switch and a scan switch which were also functionally described above. Only a circuit representation of the sampling switch 30 and of the scan switch 70 is depicted. The other sampling switches 31 through 49 are similar to the sampling switch 30 and the other scan switches 71 through 89 are similar to the scan switch 70.

The sampling switch 30 includes six diodes 181 through 186, two of which, the diodes 181 and 182, are individually connected to the leads 179 and 180. The leads 179 and 180 are, in this manner, connected to the diodes 181 and 182 in each of the 20 sampling circuits 130 through 149, inclusive.

With a 12 volt potential on the lead 179 and a plus 12 volt potential on the lead 180, the diodes 181 and 182 are forward biased. The diode 181 is biased by a connection through a resistor 187 to a plus 100 volt potential source, and the diode 182 is biased by a connection through a resistor 188 to a minus 100 volt potential source. The resistors 187 and 188 may have suitable values such as 100 kilohms each. Assuming negligible voltage drops across the diodes 181 and 182, the anode of the diode 181 is, therefore, at a potential of minus 12 volts and the cathode of the diode 182 is at a potential of plus 12 volts.

The four diodes 183 through 186, inclusive, are connected in a ring with the junction between the diodes 183 and 185 being connected to the anode of the diode 181 and the junction between the diodes 184 and 186 being connected to the cathode of the diode 182. The potential at these two junctions is, therefore, respectively minus 12 volts and plus 12 volts during the normal condition of the circuit 113. The diodes 183 through 186, inclusive, are poled in a direction of positive current from the junction between the diodes 183 and 185 to the junction between the diodes 184 and 186. All four diodes 183 through 186 are accordingly reverse biased by the 24 volt potential difference across the two opposite junctions. The input analog potential is supplied from the input circuit 10 to the junction between the diodes 183 and 184, and the output from the sampling switch 30 is taken from the junction between the diodes 185 and 186. As indicated above, the input signal varies between plus and minus 8 volts. Throughout this range, the four diodes 183 through 186 remain reverse biased as long as the potential at the upper junction of the ring is minus 12 volts, and at the lower junction is plus 12 volts.

When the 80 microsecond sampling pulse is introduced to the control circuit 113, the potential conditions on the leads 179 and 180 reverse to reverse bias the diodes 181 and 182. Suppose, for example, the instantaneous value of the input circuit from the circuit 10 at the time the control circuit 113 is operated is plus 5 volts. As the potential on the lead 179 changes from minus 12 volts to plus 12 volts, the diode 181 remains forward-biased until the potential of plus 5 volts is attained. When the potential on the lead 179 increases over plus 5 volts, the upper junction of the four diode ring remains clamped at plus five volts by the circuit 10 to reverse-bias the diode 181. The diode 183 becomes forward biased to clamp the potential of the ring at plus 5 volts.

The diode 184 becomes forward biased sooner in the brief switching interval to clamp the lower junction at a potential plus 5 volts as the potential on the lead 180 changes from plus 12 volts to minus 12 volts.

The four diodes 183 through 186 become, in this manner, forward biased and the diodes 181 and 182 become reverse-biased when the potential conditions on the leads 179 and 180 are reversed. The potential at the junction of the diodes 185 and 186 accordingly is also at plus 5 volts. The functional effect of the forward-biasing of the four diodes is to establish a connection from the input circuit for charging the capacitor 50 which is coupled to the junction of the two diodes 185 and 186. The capacitor 50 is quite small having a suitable value such as 8,000 micro-microfarads so that it charges quite rapidly.

Assuming, for the moment, that the potential across the capacitor 50 before the switch 39 is operated is zero volts. When the switch is closed, the diodes 183 and 184 become forward biased to clamp the potential at the upper and lower junction of the diode ring. With an input of plus 5 volts and zero volts at the capacitor 50, the diode 185 becomes forward biased and the diode 186 becomes reverse biased.

The capacitor 50 is, in this manner, charged over a path from the plus 100 volt potential source through the resistor 187 and the diode 185 until the magnitude of the potential across the capacitor 50 is equal to the instantaneous potential of the input signal. If the potential of the input signal is less positive than the potential across the capacitor 50, the diode 186 becomes forward biased and the diode 185 becomes reverse biased so that the capacitor 50 effectively discharges through the diode 186 and the resistor 188 to the minus 100 volt potential source. Due to the relatively small magnitude of the capacitor 50, the potential across the capacitor 50 readily follows the changes of the input signal during the time that the sampling switch 30 is closed. The aperture time for the potential across the capacitor 50 to change from its initial value to the value of the input signal is quite small.

At the end of the 80 microsecond sampling interval, the control circuit 113 again reverses the potential conditions on the leads 179 and 180 to open the sampling switch 30. More particularly, the diodes 181 and 182 are again forward biased to clamp the potentials at the upper and lower junctions of the four diodes 183 through 186 at the respective output potentials of the circuit 113 instead of at the input potential from the circuit 10. The four diodes 183 through 186 accordingly become reverse biased to halt any changes in the potential across the capacitor 50. The capacitor 50 remains charged, therefore, to a potential equal to the substantially instantaneous potential of the input signal at the end of the sampling interval.

The capacitor 50 is connected to a scan switch 70 which is similar to the sampling switch 30 and which is open at this time so that a discharge path is not available to reduce or change the potential across the capacitor 50. The scan switch 70, the capacitor 50 and the sampling switch 30 are all part of the circuit 130 which is individual to the input circuit 10. Similar circuits 131 through 149 are respectively provided for the input circuits 11 through 29.

The scan switch 70, as indicated above, is substantially similar to the sampling switch 30, including two resistors 197 and 198, which are connected respectively between the plus and minus 100 volt potential source across a four diode ring arrangement. The four diodes 193 through 196 are coupled in a ring arrangement between the resistors 197 and 198, which may have suitable values such as 200 kilohms each. The scan switch 70 is accordingly quite similar to the sampling switch 30 but includes as part of the ring arrangement a potentiometer 199 having its opposite end terminals connected respectively to the diodes 195 and 196 of the ring. The center tap of the potentiometer 199 is connected to the common output lead 150 from the 20 scan switches 70 through 89, respectively included in the sampling circuits 130 through 149. The potentiometer 199 is utilized to adjust the level of the output signals from the scan switch 70.

The four diodes 193 through 196 are normally reverse biased due to the connection of the upper and lower junctions of the ring arrangement to the control diodes 191 and 192. The two control diodes 191 and 192 are normally forward biased to clamp the upper and lower junctions of the switch 70 to reverse bias the four diodes 193 through 196. The biasing of the two control diodes 191 and 192 is controlled by an amplifier arrangement which is somewhat similar to the amplifier arrangement in the control circuit 113. The components in the amplifier arrangement which controls the scan switch 70 that are similar to corresponding components in the control circuit 113 have been given similar reference designations with the addition of 100. For example, the transistor 266 corresponds to the transistor 166 in the control circuit 113.

The amplifier arrangement for the scan switch 70 includes two opposite conductivity type transistors 266 and 272 which are normally conductive. The output potentials from the amplifier arrangement are respectively from the collector electrodes of the transistors 266 and 272 to the diodes 191 and 192. The collector potential of the transistor 266 is normally at minus 12 volts and the potential of the collector electrode of the transistor 272 is normally at plus 12 volts. As described above, scan pulses are sequentially provided from the programmer 115 to the 20 sampling circuits 130 through 149. Each of these pulses has a duration of 15 microseconds and a magnitude of minus 10 volts. The negative scan pulse at the circuit 130 is introduced to the junction between the resistors 261 and 262 which together with the resistor 268 form a voltage divider arrangement between the plus 12 volt potential source and the minus 34 volt potential source. The resistor 262 which is part of the voltage divider arrangement is shunted by a capacitor 263 which functions to reduce the switching interval.

The negative scan pulse reduces the potential on the base electrode of the transistor 266 to reverse bias its base-to-emitter junction and forward bias the diode 267. When the transistor 266 becomes non-conductive, it also inhibits conduction through the transistor 272. The collector electrode of the transistor 266 is biased by a connection through a resistor 278 to the plus 12 volt potential source. The resistor 278 is part of a voltage divider arrangement including the resistors 271 and 274 which are connected between the plus 12 volt potential source and the plus 50 volt potential source. The resistor 271 is shunted by the capacitor 270 which couples the pulse appearing at the collector electrode of the transistor 266 to the base electrode of the transistor 272. The negative pulse at the collector electrode of the transistor 266 accordingly decreases the potential at the base electrode of the transistor 272 and forward biases the shunting diode 273. The collector electrode of the transistor 272, which is biased by a connection through the resistor 267 to the minus 12 volt potential source, is connected to the anode of the diode 192.

In this manner, the 15 microsecond scan pulse reverses the conductive conditions of the transistors 266 and 272 to reverse the potential conditions provided to the diodes 191 and 192. The potentials across the four diode ring arrangement of the scan switch 70 accordingly reverses so that the potential at the adjustable tap of the potentiometer 199 changes to correspond with the potential across the capacitor 50. As each of the scan switches 70 through 89 in the circuits 130 through 149, respectively, are operated, an output pulse is provided to the common lead 150 which has a duration of 15 microseconds and a magnitude and polarity corresponding to the substantially instantaneous value of the associated input signal.

As illustrated in FIGURE 1, the common lead 150 is connected by a resistor 116 to an amplifier 117. The amplifier 117 is a high response amplifier which drains only a small amount of energy from the capacitor 50. The amplified pulses from the amplifier 117 are introduced to an electronic two-position switch 120. The two positions are designated as "hold" and "sample" positions in FIGURE 1. The switch 120 is normally in its sample position so that the amplified pulses are successively provided through the switch 120 to a storage capacitor 122. The storage capacitor 122 introduces the potential across it to a buffering amplifier 123 which is connected by a feedback resistor 119 to the input of the amplifier 117. The arrangement, including the two amplifiers 117 and 123 and the resistor 119 functions as an operational amplifier with the capacitor 122 charging to a potential related to the magnitude of the input pulse provided through the common lead 150.

The switch 120 is controlled through a lead 111 from the programmer 115. As indicated by curve *h* in FIGURE 3, the programmer 115 provides a sharp halt pulse 10 microseconds after the beginning of each scan pulse successively provided through the leads 90 through 109, inclusive. In this manner, 10 microseconds after the reception of a pulse through the switch 120, the switch 120 is operated from its sample to its hold position. The switch 120 is bi-stable so that it remains in its hold position until reset by a sample pulse through lead 118 to its sample position. The output of the buffering amplifier 123 is, therefore, indicative of the potential across the capacitor 122 which corresponds to the sampled value of one of the input signals. As indicated above, the amplifier 117 is a high impedance amplifier with a maximum of approximately 2.5 percent change of potential occurring across the sampling storage capacitor in the successively scanned circuits 130 through 149.

During the first 10 microseconds of each 15 microsecond scanning interval, as illustrated by curve (*f*) in FIGURE 3, the capacitor 122 charges to the potential on the common lead. The hold pulse from the programmer 115 thereupon operates the switch 120 to hold the potential on the capacitor 122. In the sample position, the feedback resistor 119 minimizes any differential between the incoming signal and the hold potential at the capacitor 122. Feedback stabilization, in the form of the resistor 121, is also provided for the amplifier 117 when the switch 120 is in its hold position. The feedback resistor 121 prevents blocking of the amplifier 117 when the switch 120 is in its hold position.

The output of the buffering amplifier 123 is introduced as an analog input signal to the analog-to-digital converter 124. As indicated above, the converter 124 may be of the type described in the above identified disclosure by Beck, Giel, and Palevsky. At the same time that the switch 120 is operated to its hold position, the operation of the converter 124 is initiated by the programmer 115. The converter 124 functions to digitize the analog signal providing it to a utilization of output apparatus 125. The conversion interval of the analog-to-digital converter 124 is illustratively 50 microseconds. This interval varies in accordance with the number of digits utilized for the output. The 50 microsecond interval is illustrative for an output in the form of 11 binary digits.

At the end of the conversion interval, the converter 124 provides a sample pulse through lead 118 to operate the switch 120 back to its sample position. As illustrated in curve (*g*) of FIGURE 3, the sample pulse is provided from the converter 124 before the next pulse is received on the common lead 150.

The sequence continues in this manner as pulse after pulse is provided from the circuits 130 through 149 through the common lead 150. During each of these pulses, the capacitor 122 is charged to the potential of one of the capacitors 50 through 69 and thereafter this potential is digitized by the converter 124. The converter 124 completes the conversion before the next pulse is provided through the common lead 150. Though the analog-to-digital converter 124 has a relatively long conversion interval, illustrative of 50 microseconds, an effective sampling interval of less than 1 microsecond is achieved. This brief sampling interval is achieved because the capacitors 50 through 69 are relatively small so as to follow the variations of the input signals. The output digitized signals to the apparatus 124, though sequentially provided, represent the simultaneous sampling of the 20 input signals from the circuit 10 through 29 at the end of the 80 microsecond sampling interval.

Although this application has been disclosed and illustrated with reference to particular applications, the principles involved are susceptible of numerous other applications which will be apparent to persons skilled in the art. The invention is, therefore, to be liimted only as indicated by the scope of the appended claims.

What is claimed is:

1. A system for converting a number of varying analog signals to digital signals, including, means for periodically sampling the varying input signals, said sampling means having a capacitive storage device for each of said varying input signals, and means for simultaneously charging said capacitive storage devices to potentials substantially equal to the instantaneous magnitudes of the associated input signals, means coupled to said capacitive storage devices and operable between periodic sampling operations of said sampling means for sequentially scanning said devices to develop a series of pulses having predetermined similar durations and having magnitudes substantially indicating the instantaneous magnitudes of the input signals, a bistable amplifier arrangement coupled to said sequential scanning means having a sampling condition for registering a signal representing the magnitude of a pulse from said sequential scanning means, and a hold condition for maintaining a registered signal at a constant value; and a converter coupled to said amplifier arrangement for successively converting the registered signals to digital signals representing the maintained constant values of the registered signals, said converter having a conversion interval smaller than the period between pulses from said sequential scanning means.

2. A system for converting a number of varying analog signals to digital signals in accordance with claim 1, including, in addition, means for operating said amplifier arrangement to its hold condition and at the same time initiating a conversion operation by said converter, and means controlled by said converter at the end of the conversion interval of said converter for resetting said amplifier arrangement back to said sampling condition.

3. A system for converting a number of varying analog input signals to digital signals, including, means for simultaneously sampling the varying input signals, storage means coupled to said sampling meas for individually storing the sampling signals for each of the varying input signals, means coupled to said storage means for sequentially developing signals having magnitudes corresponding to the stored signals for the varying input signals, a bistable amplifier arrangement coupled to said sequential scanning means having a sampling condition for registering a signal representing the magnitude of a pulse from said sequential scanning means, and a hold condition for maintaining a registered signal at a constant value; a converter coupled to said amplifier arrangement for successively converting the registered signals to a digital signal representing the maintained constant values of the registered signals, said converter having a conversion interval smaller than the period between pulses from said sequential scanning means, means for operating said amplifier arrangement to its hold condition and at the same time initiating a conversion operation by said converter, and means effective at the end of the conversion interval of said converter for resetting said amplifier arrangement back to said sampling condition.

4. A system for converting successive pulses of varying magnitudes to digital signals representing the magnitudes of the successive pulses including, a bistable amplifier arrangement for receiving the successive pulses having a sampling condition for storing a signal representing the magnitude of a received pulse, and a hold condition for maintaining the stored signal at a constant value; a converter coupled to said amplifier arrangement for converting the stored signal to digital signals representing the maintained constant value, said converter having a conversion interval for completing the conversion to the digital signals which is smaller than the period between the successive pulses, means for operating said amplifier arrangement to its hold condition and at the same time initiating a conversion operation by said converter, and means effective at the end of the conversion interval of said converter for resetting said amplifier arrangement back to said sampling condition.

5. A system for converting successive pulses of varying magnitudes to digital signals representing the magnitudes of the successive pulses in accordance with claim 4 wherein said amplifier arrangement includes a first amplifier for receiving the successive pulses, two position switching means controlled by said amplifier arrangement operating means, storage means coupled by said switching means to said first amplifier when said switching means is in one of its two positions to sample a received input pulse, and a second amplifier coupled to said storage means for introducing a signal stored by said storage means to said converter.

6. A system for converting successive pulses of varying magnitudes to digital signals representing the magnitudes of the successive pulses, in accordance with claim 5, wherein said amplifier arrangement also includes a first stabilizing means coupled from the output of said second amplifier to the input of said first amplifier, and second stabilizing means coupled by said switching means across said first amplifier when said swtching means is in the other of its two position.

7. A system for simultaneously sampling a number of varying input signals, including, a first and a second switch for each of the varying input signals, capacitive storage means coupled between said first and said second switches associated with each of the varying input signals, means for periodically operating said first switches at one time to charge said associated capacitive storage means to the potential of the associated varying input signals, means operable between the periodic operations of said switch operating means for successively operating said second switches one after the other to scan the potential at the associated ones of said capacitive storage means so as to develop successive pulses representing the potentials scanned at said storage means, a bistable amplifier arrangement for receiving the successive pulses having a sampling condition for storing a signal representing the magnitude of a received pulse, and a hold condition for maintaining the stored signal at a constant value; and a converter coupled to said amplifier arrangement for converting the stored signal to digital signals representing the maintained constant value, said converter having a conversion interval for completing the conversion to the digital signals which is smaller than the period between the successive pulses.

8. A system for simultaneously sampling a number of varying input signals, including, a first and a second switch for each of the varying input signals, capacitive storage means coupled between said first and said second switches associated with each of the varying input signals, means for periodically operating said first switches at one time to charge said associated capacitive storage means to the potential of the associated varying input signals, means operable between the periodic operations of said switch operating means for successively operating said second switches one after the other to scan the potential at the associated ones of said capacitive storage means so as to develop successive pulses representing the potentials scanned at said storage means, a bistable amplifier arrangement for receiving the successive pulses having a sampling condition for storing a signal representing the magnitude of a received pulse, and a hold condition for maintaining the stored signal at a constant value; a converter coupled to said amplifier arrangement for converting the stored signal to digital signals representing the maintained constant value, said converter having a conversion interval for completing the conversion to the digital signals which is smaller than the period between the successive pulses, means for operating said amplifier arrangement to its hold condition and at the same time initiating a conversion operation by said converter, and means effective at the end of the conversion interval of said converter for resetting said amplifier arrangement back to said sampling condition.

9. A system for simultaneously sampling a number of varying input signals, including, a first and a second switch for each of the varying input signals, capacitive storage means coupled between said first and said second switches associated with each of the varying input signals, means for periodically operating said first switches at one time to charge said associated capacitive storage means to the potential of the associated varying input signals, means operable between the periodic operations of said switch operating means for successively operating said second switches one after the other to scan the potential at the associated ones of said capacitive storage means so as to develop successive pulses representing the potentials scanned at said storage means, a bistable amplifier arrangement for receiving the successive pulses having a sampling condition for storing a signal representing the magnitude of a received pulse, and a hold condition for maintaining the stored signal at a constant value; a converter coupled to said amplifier arrangement for converting the stored signal to digital signals representing the maintained constant value, said converter having a conversion interval for completing the conversion to the digital signals which is smaller than the period between the successive pulses, said amplifier arrangement including a first amplifier for receiving the successive pulses, two position switching means controlled by said amplifier arrangement operating means, storage means coupled by said switching means to said first amplifier when said switching means is in one of its two positions to sample a received input pulse, and a second amplifier coupled to said storage means for introducing a signal stored by said storage means to said converter.

10. A system for simultaneously sampling a number of varying input signals, including, a first and a second switch for each of the varying input signals, capacitive storage means coupled between said first and said second switches associated with each of the varying input signals, means for periodically operating said first switches at one time to charge said associated capacitive storage means to the potential of the associated varying input signals, means operable between the periodic operations of said switch operating means for successively operating said second switches one after the other to scan the potentials at the associated ones of said capacitive storage means, said output circuit including means operable during a portion of each of the successive scan signals for storing a signal representing the scan signal, and means effective after each operation of said scan signal storing means for maintaining the stored scan signal at a constant value for a predetermined interval.

11. A system for simultaneously sampling a number of varying input signals in accordance with claim 9, wherein said amplifier arrangement also includes a first stabilizing means coupled from the output of said second amplifier to the input of said first amplifier, and second stabilizing means coupled by said switching means across said first amplifier when said switching means is in the other of its two positions.

References Cited in the file of this patent

UNITED STATES PATENTS

| | | |
|---|---|---|
| 2,444,950 | Nichols et al. | July 13, 1948 |
| 2,445,840 | Ranch | July 27, 1948 |
| 2,504,999 | McWhirter et al. | Apr. 25, 1950 |
| 2,688,742 | Sweer | Sept. 7, 1954 |
| 2,788,473 | Brechman | Apr. 9, 1957 |
| 2,828,418 | Knight et al. | Mar. 25, 1958 |
| 2,899,567 | Romano | Aug. 11, 1959 |
| 2,937,369 | Newbold et al. | May 17, 1960 |

OTHER REFERENCES

Instruments and Automation (magazine), pp. 926 and 957, vol. 27, June 1954.